United States Patent [19]

Burke

[11] Patent Number: 5,996,863
[45] Date of Patent: Dec. 7, 1999

[54] DECORATIVE TIRE COVER

[76] Inventor: Ronald D. Burke, 13 Pullard Rd. #8, Grafton, Mass. 01519

[21] Appl. No.: 09/188,103

[22] Filed: Nov. 27, 1998

Related U.S. Application Data

[60] Provisional application No. 60/067,321, Dec. 5, 1997.

[51] Int. Cl.[6] ............................................. B62D 43/02
[52] U.S. Cl. .................. 224/42.2; 296/37.3; 206/304.1; 150/166
[58] Field of Search ............................. 224/42.12, 42.2; 296/37.3; 206/304, 304.1, 304.2; 150/154, 166, 103, 104, 105; D12/202

[56] References Cited

U.S. PATENT DOCUMENTS

| | | | |
|---|---|---|---|
| 1,495,665 | 5/1924 | Bigelow et al. ...................... | 206/304.1 |
| 1,543,995 | 6/1925 | Fisher . | |
| 1,567,338 | 12/1925 | Siever ................................ | 224/42.2 X |
| 1,593,921 | 7/1926 | Sutherland .......................... | 224/42.2 X |
| 1,691,939 | 11/1928 | Sanchez .............................. | 206/304 X |
| 1,704,555 | 3/1929 | Cluff ................................... | 206/304 X |
| 1,733,918 | 10/1929 | Spotswood . | |
| 1,796,628 | 3/1931 | Seward . | |
| 1,830,819 | 11/1931 | Wishmeier ....................... | 206/304.1 X |
| 1,838,887 | 12/1931 | Turner . | |
| 1,879,761 | 9/1932 | Neiler et al. . | |
| 1,943,237 | 1/1934 | Harrington . | |
| 2,072,490 | 3/1937 | Whaley . | |
| 2,302,560 | 11/1942 | Latona ................................ | 150/104 X |
| 2,632,268 | 3/1953 | Schroeder . | |
| 2,656,870 | 10/1953 | Wishnia .................................. | 150/104 |
| 4,214,683 | 7/1980 | Wills et al. . | |
| 5,228,608 | 7/1993 | Stout, III ............................. | 224/42.2 X |
| 5,316,376 | 5/1994 | Defreitas . | |

FOREIGN PATENT DOCUMENTS

| | | | |
|---|---|---|---|
| 111393 | 7/1964 | Czechoslovakia ..................... | 150/103 |
| 1188397 | 4/1970 | United Kingdom . | |

OTHER PUBLICATIONS

Ford Times, Jan. 1970, vol. 64, p. 36.

*Primary Examiner*—Gregory M. Vidovich
*Attorney, Agent, or Firm*—Richard C. Litman

[57] ABSTRACT

A decorative tire cover for covering a spare tire while displaying a photograph or artwork from within. The photograph or artwork is enclosed in an environment that is substantially waterproof, yet is easily accessible when the photograph or artwork is to be replaced. The decorative tire cover is defined by a flexible tire cover having a first circular opening formed in one side thereof for enabling a photograph or artwork situated inside thereof to be visible to someone outside the flexible tire cover. An opposing side of the flexible tire cover has a second circular opening formed therein for enabling the flexible tire cover to be wrapped around a spare tire. A transparent protective cover is attached to an inner surface of flexible tire cover overlapping the first circular opening for protecting the photograph or artwork from weather damage. Removably attached to the protective cover is an inner annular ring for confining a photograph or artwork to a fixed region adjacent the protective cover.

8 Claims, 5 Drawing Sheets

DECORATIVE TIRE COVER

CROSS-REFERENCE TO RELATED APPLICATION

This application claims the benefit of U.S. Provisional Patent Application Ser. No. 60/067,321, filed Dec. 5, 1997.

BACKGROUND OF THE INVENTION

1. Field of the Invention

The present invention relates to a vehicle wheel cover and more particularly to a vehicle wheel cover which may present decorative or informative indicia thereon.

2. Description of Related Art

The use of vehicle tire covers is well known in the prior art. One well known accessory is a flexible tire cover for a spare tire which is carried externally on the rear of a vehicle in an exposed manner. These covers are provided to protect such spare wheels from the elements. To add aesthetic value to such covers, readily visible personalized messages or artwork are sometimes applied thereto. However, none of the known vehicle tire covers provide for a tire cover which displays a photograph or other artwork in a substantially waterproof, yet easily accessible enclosure.

U.S. Pat. No. 5,316,376 discloses a decorative wheel cover that is attached to a wheel rim. The cover has a magnifying lens that is placed over a disk bearing decorative indicia or artwork. However, this cover is not waterproof. Also, this cover attaches only to the wheel rim and does not cover the entire spare tire.

U.S. Pat. No. 4,214,683 discloses an illuminated wheel cover which is mounted on an exposed spare vehicle wheel. This cover has an indicia bearing disk that is attached to a flexible cover which is placed over the entire spare tire. However, this cover does not provide any protection against the elements for the indicia bearing disk.

Further less relevant examples of indicia bearing wheel covers include U.S. Pat. Nos. 2,632,268; 2,072,490; 1,943,237; and 1,879,761.

Therefore, the present invention attempts to overcome the deficiencies in the prior art by providing a vehicle tire cover for attachment to a spare vehicle tire which may be utilized for displaying photographs or other artwork in a substantially waterproof, yet easily accessible environment.

None of the above inventions and patents, taken either singly or in combination, is seen to describe the instant invention as claimed.

SUMMARY OF THE INVENTION

In view of the foregoing limitations of the wheel covers described in the prior art, the present invention provides an improved decorative tire cover that covers a spare tire of a motor vehicle and displays a photograph or other artwork in a substantially waterproof, yet easily accessible environment.

Preferably, the decorative tire cover is defined by a flexible tire cover made of a waterproof material having a first circular wall and a second circular wall integrally connected to the first circular wall by a side wall. The first circular wall has an inner surface and an outer surface. A first circular opening is defined by the first circular wall for enabling a photograph or artwork contained within to be visible from outside the flexible tire cover. A second circular opening is defined by the second circular wall for enabling the flexible tire cover to be wrapped around a spare tire.

An outer annular ring is fixedly attached to the outer surface to serve as an outer frame for a photograph or piece of artwork contained within the flexible tire cover. The outer annular ring is positioned concentrically about the first circular opening. Fixedly attached to the inner surface is a protective cover spanning the first opening, the protective cover having a first side and a second side and used for shielding a photograph or piece of art contained with the flexible tire cover. The protective cover is made of a transparent material enabling a photograph or piece of artwork to be visible from outside the decorative tire cover. The protective cover and outer annular ring are joined to an inner annular ring made of a rigid material, removably attached to the second circular wall for the purpose of selectively confining a photograph or piece of artwork behind the protective cover.

Accordingly, it is a principal object of the invention to provide an improved photo tire cover which displays a photograph or other artwork in a substantially waterproof, yet easily accessible environment.

It is a further object of the invention to provide an improved photo tire cover which protects the displayed photograph or artwork from damage by road debris.

Still another object of the invention is to provide an improved photo tire cover which allows the photograph or artwork to be easily replaced.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
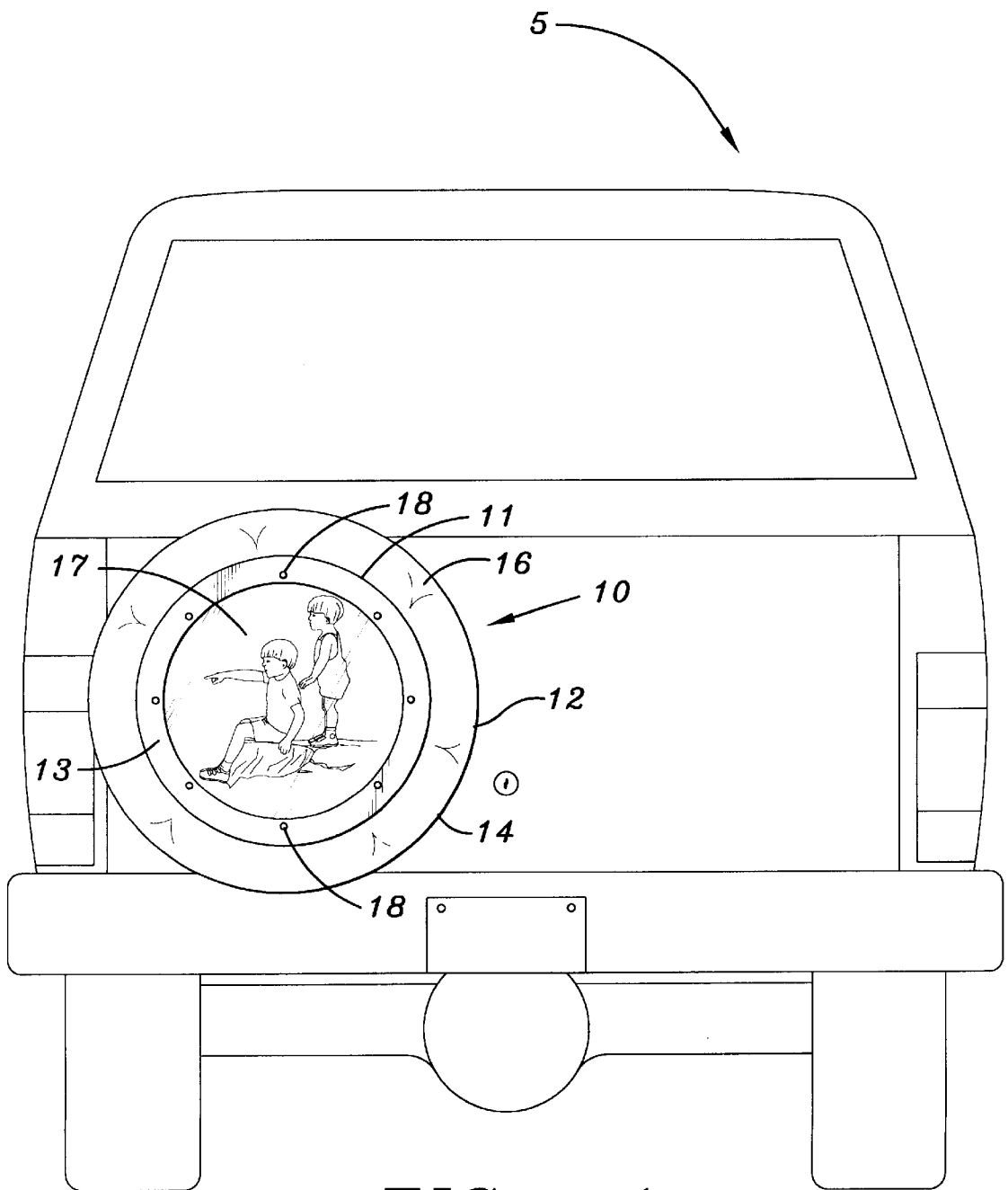
FIG. 1 is an environmental, end view of a vehicle with a tire cover according to the present invention, mounted on a vehicle spare tire.
Figure 2:
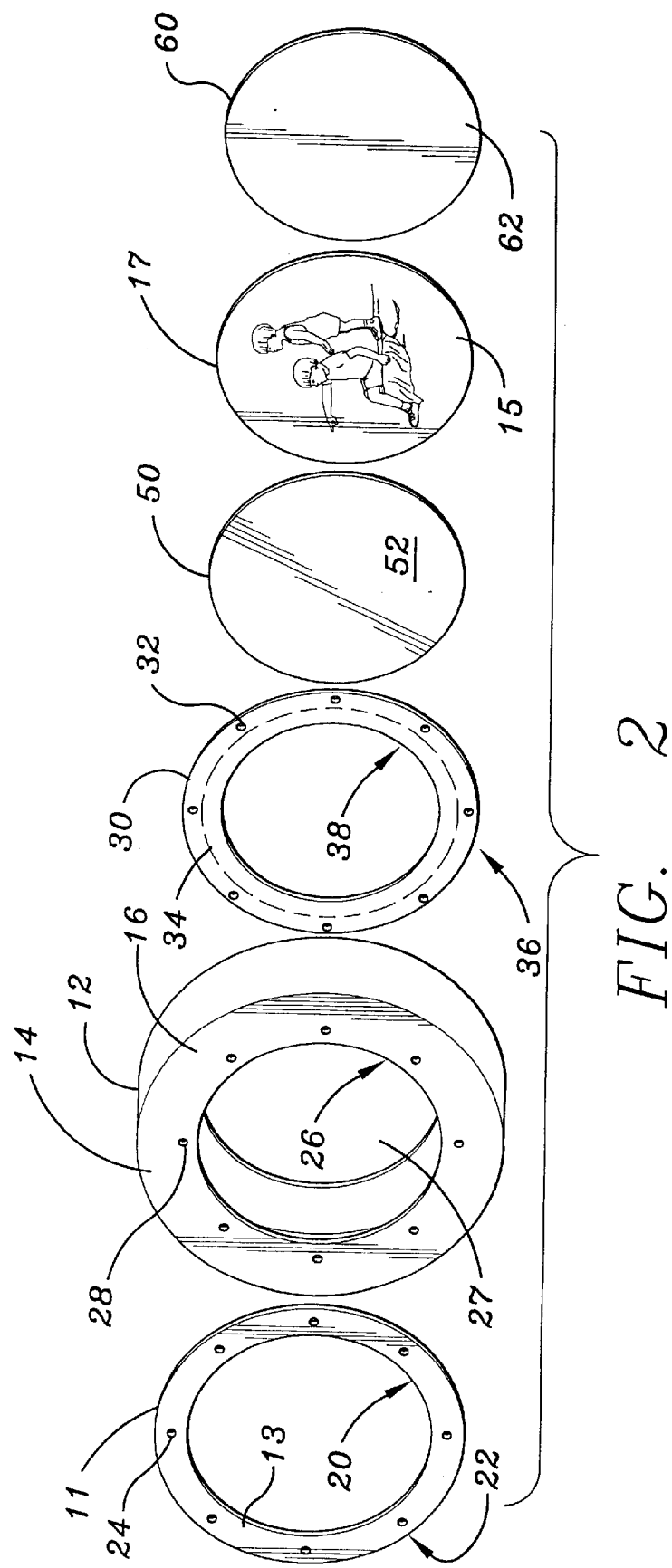
FIG. 2 is an exploded view of a tire cover according to a first embodiment of the present invention.

Referring now to FIG. 1, a decorative cover for a spare wheel and tire 10 of the present invention is shown covering a spare wheel and tire which are mounted onto the rear of a vehicle 5. A flexible tire cover 12 made of a waterproof material is placed over the spare vehicle tire. As best seen in FIG. 2, the flexible tire cover 12 has a circular opening 27 with a diameter 26. The diameter 26 will vary in size depending on the size of the vehicle wheel.

Figure 3:
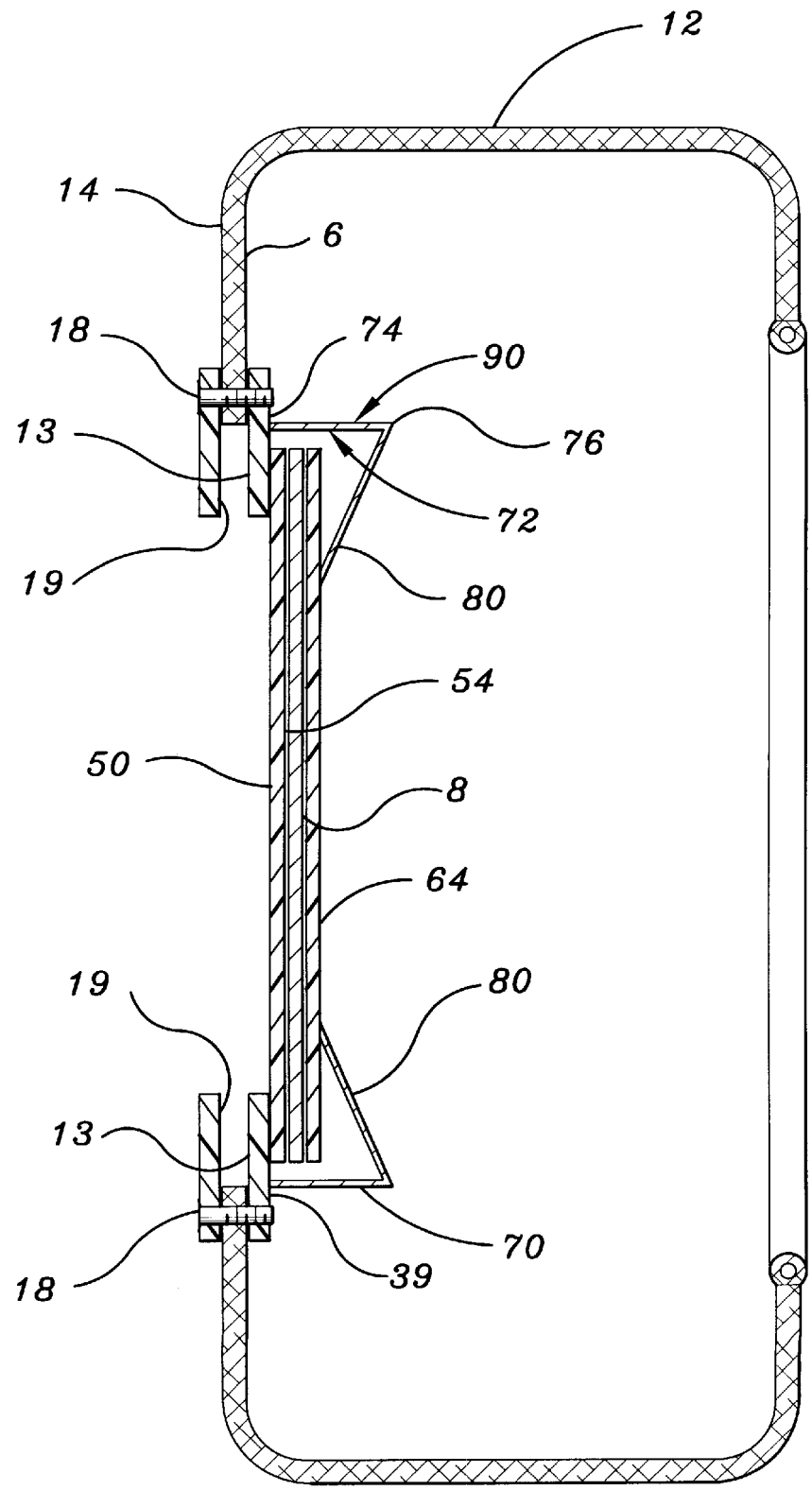
FIG. 3 is a cross-sectional view of a tire cover according to a first embodiment of the present invention.

A tire cover according to a first preferred embodiment will now be described. Shown in FIGS. 2 and 3 are an exploded and a cross-sectional view, respectively, of a tire cover 12 according to the first embodiment. Referring to FIG. 2 and FIG. 3 together, an outer annular mounting ring 11 has a first side 13, and a second side 19 that is attached to an outer surface 16 of a first wall 14 of the flexible tire cover 12, by a waterproof adhesive. The outer annular mounting ring 11 is mounted so that it is concentric with the circular opening 27 of the flexible tire cover 12. The outer annular mounting ring 11 has an inner diameter 20 that is approximately equal to the diameter 26 of the circular opening 27. The outer annular mounting ring 11 has an outer diameter 22 that is greater than the inner diameter 20.

As illustrated best by FIG. 3, an inner annular mounting ring 30 has a second side 39, and, a first side 34 that is attached to an inner surface 6 of the first wall 14 of the flexible tire cover 12 by a waterproof adhesive. The inner annular mounting ring 30 is mounted so that it is concentric with the outer annular mounting ring 11. The inner annular mounting ring 30 has an inner diameter 38 and an outer diameter 36 having the same dimensions as those of the outer annular mounting ring 11.

A plurality of peripherally oriented apertures 24, 28, and 32 are located in registry with one another in each of the outer annular mounting ring 11, the inner annular mounting ring 30, and the flexible tire cover 12, respectively. An elongated fastening means 18 passes through each of apertures 24, 28, and 32, thereby serving to secure outer annular mounting ring 11, the inner annular mounting ring 30, and the flexible tire cover 12 together.

A cylindrical support ring 70 has a length 90 defined between a second end 76 and a first end 74, and is concentrically attached to the second side 39 of the inner annular mounting ring 30. The length 90 of the cylindrical support ring 70 extends along an axis that is perpendicular to the inner annular mounting ring 30. The cylindrical support ring 70 has a diameter 72 which is less than the outer diameter 36 of the inner annular mounting ring 30.

A front protective cover 50 made of transparent material is concentrically placed within the diameter 72 of the cylindrical support 70. A first side 52 of the front protective cover 50 is attached to the second side 39 of the inner circular annular ring 30 by a waterproof adhesive. An indicia 17 is concentrically placed within the cylindrical support 70 so that a first side 15 of the circular indicia 17 is in contact with the second side 54 of the front protective cover 50. A rear protective cover 60 made of a rigid material is concentrically placed with the cylindrical support 70. A first side 62 of the rear protective cover 60 is in contact with a second side 8 of the circular indicia 17, so as to ensure the flatness of the circular indicia 17 against the front protective cover 50.

A plurality of securing means 80 are attached to the second end 76 of the cylindrical support ring 70. The securing means 80 may be elastic bands spanning the opening and forming a chord of the circle defining the opening, metal clamps, or any other means suitable to hold the rear protective cover 60 securely against the second side 8 of the circular indicia 17. The securing means 80 is not shown if FIG. 2 for clarity.

Figure 4:
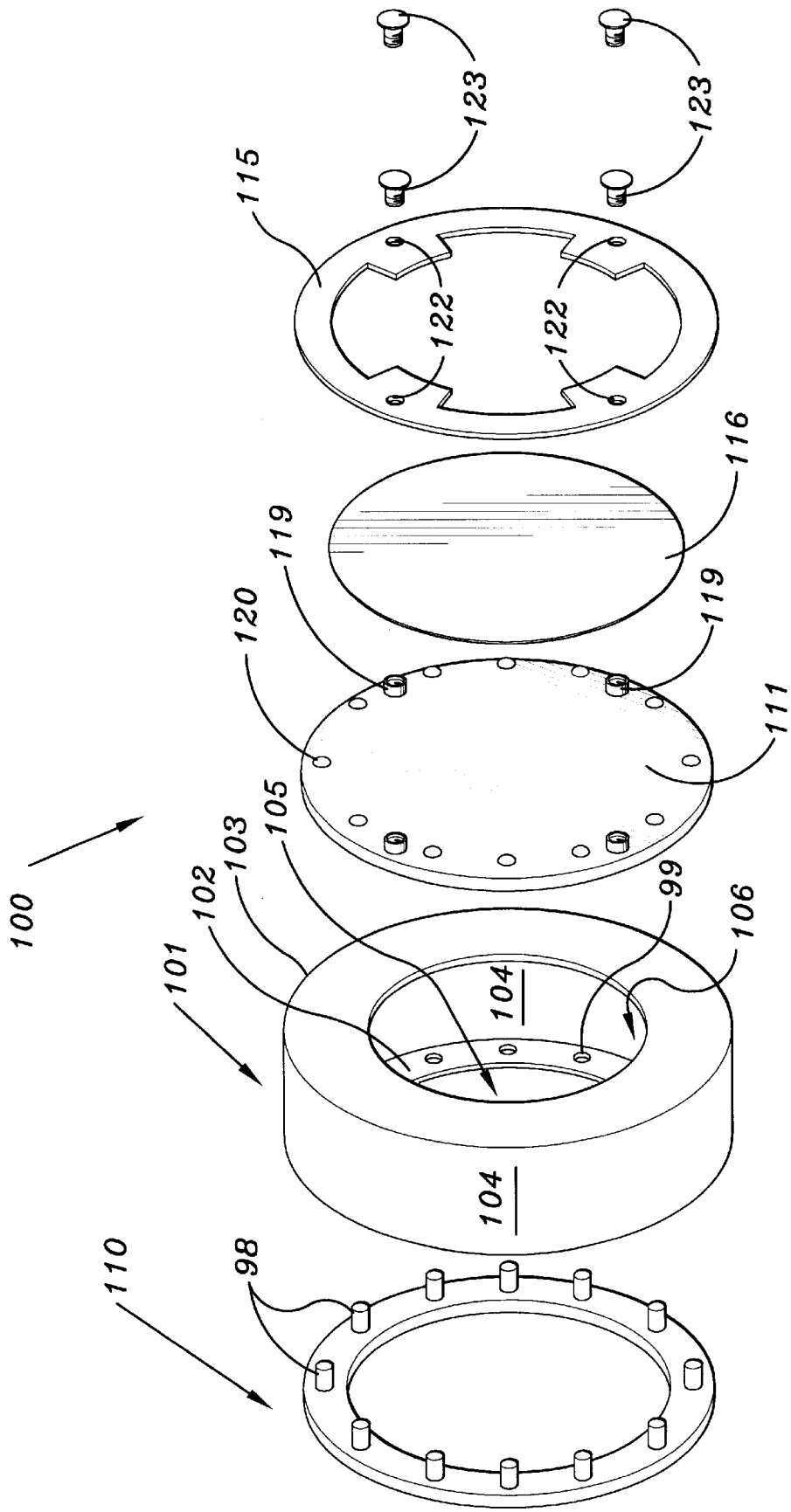
FIG. 4 is exploded rear view of a tire cover according to a second embodiment of the present invention.
Figure 5:
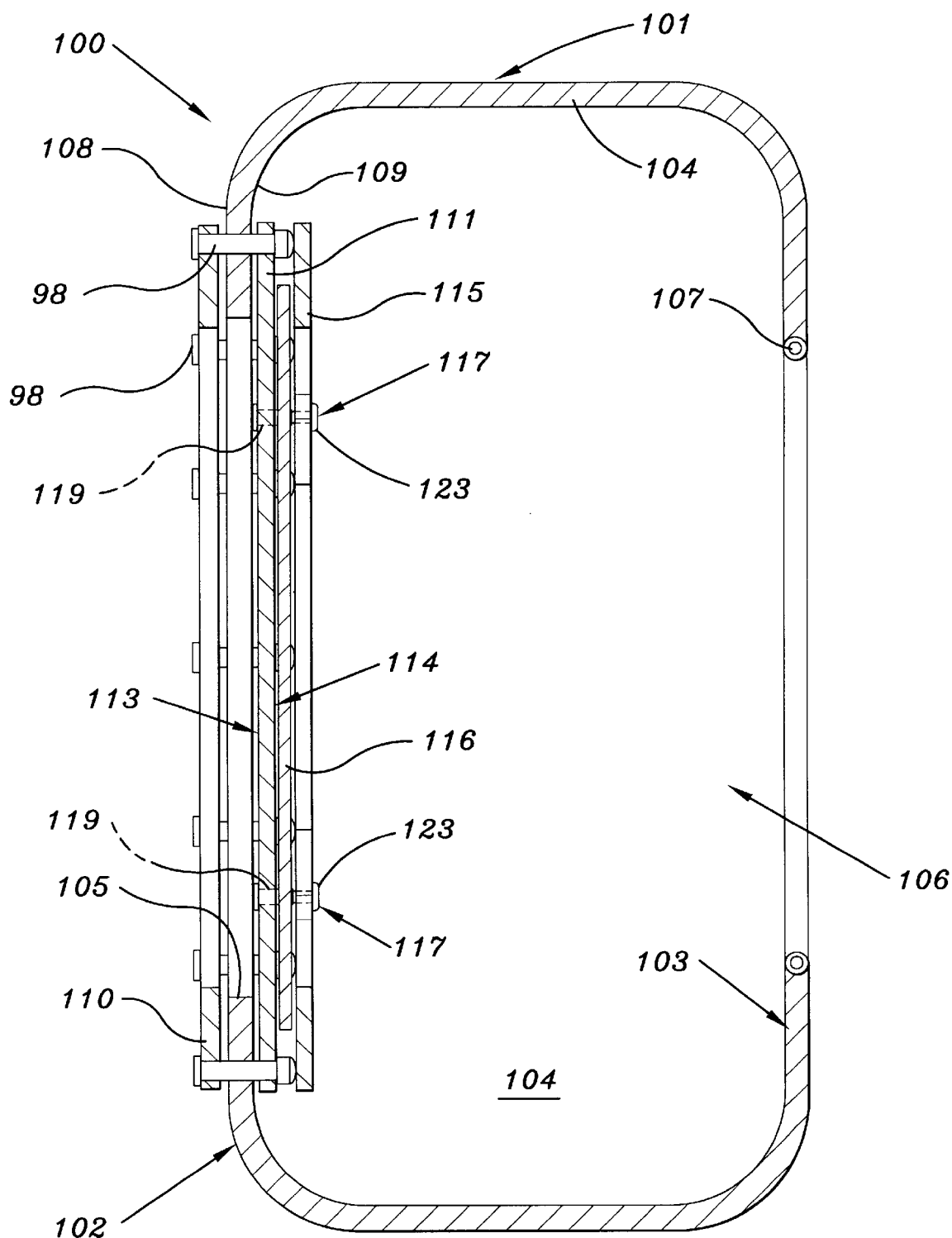
FIG. 5 is a cross-sectional view of a tire cover according to a second embodiment of the present invention.

Next, a decorative tire cover according to a second preferred embodiment of the invention as best understood from FIGS. 4 and 5 together. Shown in FIG. 5 is a cross-sectional view of a decorative tire cover 100 according to a second preferred embodiment for protecting a spare tire from weather damage while displaying a photograph or other artwork therefrom. The decorative tire cover 100 is defined by a flexible tire cover 101 made of a waterproof material. The flexible tire cover 101 is defined as a substantially cylindrically shaped body having a first circular wall 102 at one end thereof, a second circular wall 103 integrally attached to the first circular wall 102 at an opposing end by a side wall 104. Formed in the first circular wall 102 is a first circular opening 105 for enabling a photograph or artwork contained within the flexible tire cover to be visible from outside thereof. The first circular wall 102 is further defined by an inner surface 109 and an outer surface 108. The flexible tire cover 101 further defines a plurality of first holes 99 formed in the first circular wall 102 in a circular pattern peripherally around the first circular opening 105, each hole 99 for receiving a rivet therethrough. The first holes 99 are spaced equally around the circle, in a manner similar that of the first embodiment shown in FIG. 2.

Formed in the second circular wall 103 is a second circular opening 106 for enabling the flexible tire cover 101 to be wrapped around a spare tire. Fixedly attached to the second circular wall 103 around the second circular opening 106 is an elastic band 107 for reducing the size of the second circular opening 106 outside of the spare tire. Preferably, formed in the second circular wall 103 adjacently surrounding the second circular opening 106 is a circular pocket retaining the elastic band 107 therein.

Fixedly attached to the outer surface 108 of the first circular wall 102 is an outer annular ring 110 forming an outer frame for a photograph or piece of artwork placed inside the flexible tire cover. Preferably, the outer annular ring 110 has an outer diameter of approximately 17¾ inches, an inner diameter of 12⅞ inches, and a thickness of 1/16 inch. The outer annular ring 110 is positioned concentrically about the first circular opening 105. Formed in the outer annular ring 110 are a plurality of second holes, each receiving a rivet 98 (diagrammatically shown in FIG. 4 as affixed to ring 110). The plurality of second holes formed in the outer annular ring 110, and consequently rivets 98, are equally spaced in a circular pattern, the holes and rivets aligned in registry with the first holes 99 formed in the flexible tire cover 101, permitting passage of rivets 98 through holes 99.

Fixedly attached to the inner surface 109 of the first circular wall 102 is a protective cover 111 having a first side 113 and a second side 114 for protecting a photograph or a piece of artwork from weather damage. The first side 113 is attached to the inner surface 109. The protective cover 111 is made of a transparent material for enabling a photograph or piece of artwork to be visible to a viewer from outside the decorative tire cover 100. Preferably, the protective cover 111 is approximately 18 inches in diameter and ⅛ inch thick and made of plastic. Formed in the protective cover 111 are a plurality of third holes 120 that are equally spaced in a pattern in registry with the first holes 120 formed in the flexible tire cover 101, also for receiving the plurality of rivets 98 therethrough, thereby joining the annular ring 110 to the protective cover 111 and sandwiching the tire cover wall 102 therebetween. The rivet 98 is a conventional rivet, having a shaft of cross sectional diameter marginally less than the diameter of the first and second holes.

The protective cover 111 further includes a plurality of threaded sockets 119 for receiving a matingly threaded male fastener 123. The fastener assembly 117 (FIG. 4), comprising sockets 119 and male fastener 123, permit an inner rigid annular ring 115 to be removably mounted to the protective cover 111 in a manner that sandwiches a photograph or other art piece 116 therebetween.

The fastener assembly 117 is a conventional threaded rivet which may be commercially obtained. To join the socket portion 119 to the protective cover 111, the cover 111 defines a plurality of fourth holes (corresponding in position to sockets 119 but not numbered), each sized for receiving a socket portion 119 therethrough. According to a preferred embodiment, the fourth holes are spaced equally apart in a circle defined having a predetermined diameter. As shown in FIG. 4, preferably the protective cover has four such positions, through each of which a socket 119 is passed and then fixedly attached to the protective cover 111.

Therefore, an inner annular ring 115 for confining a photograph or piece of artwork 116 between the ring 115 and the cover 111 may be removably attached to the second side 114 of the protective cover 111. Preferably, the inner annular ring 115 is approximately 17¾ inches in diameter and a thickness of approximately 1/16 inch. Formed in the inner annular ring 115 are a plurality of the fifth holes 122, each for receiving therethrough a mating male portion 123 and socket 119 of the fastener assembly. As can be appreciated from FIG. 5, when the socket 119 and the male portion 123 are joined, the annular ring 115 can be tightened against the photograph 116 by progressively screwing the male portion 123 into the socket 119.

It is to be understood that the present invention is not limited to the sole embodiment described above, but encompasses any and all embodiments within the scope of the following claims.

I claim:

1. A decorative tire cover comprising:

a tire cover made of a flexible material, defining a first wall and a second wall integrally connected by a side wall, said first wall having an inner surface and an outer surface and defining a first opening, said second wall defining a second opening for enabling said flexible tire cover to be wrapped around a spare tire;

an outer annular ring fixedly attached to said outer surface, said outer annular ring positioned concentrically about said first opening;

a transparent protective cover having a first side and a second side, said second side fixedly attached to said inner surface of said first wall of said tire cover; and an inner annular ring made of rigid material; and attachment means for removably attaching said inner annular ring to said first side for confining a photograph or piece of artwork to a fixed region adjacent said first side.

2. The decorative tire cover as recited in claim 1 wherein said first wall defines a plurality of first holes, each for receiving a rivet therein, wherein said plurality of first holes are equally spaced in a circular pattern and wherein said circular pattern is concentric with said first opening;

wherein said outer annular ring defines a plurality of second holes, each different one aligned in registry with a different one of said plurality of said first holes, each for receiving the same rivet therein;

wherein said protective cover defines a plurality of third holes, each different one aligned in registry with a different one of said plurality of said first and second holes; and further comprising a rivet fixedly inserted through at least two of said plurality of first, second and third holes for fixedly attaching the outer annular ring and the protective cover to the flexible tire cover.

3. The decorative tire cover as recited in claim 2 wherein said protective cover defines a plurality of fourth holes, each for receiving a fastener assembly therethrough; wherein said inner annular ring defines a plurality of fifth holes, each for receiving a same fastener assembly therethrough; and wherein said attachment means comprise a plurality of fastener assemblies, each comprising a male portion and a receiving socket, each said assembly inserted in a different one of said fourth and fifth holes, said assembly for removably attaching said protective cover to said inner annular ring.

4. The decorative tire cover as recited in claim 3, wherein each said male portion and said receiving socket of said plurality of fastener assemblies is matingly threaded.

5. The decorative tire cover as recited in claim 1, wherein said protective cover is made of transparent plastic material.

6. The decorative tire cover as recited in claim 1, wherein said protective cover, said first opening and said annular rings are each circular.

7. A decorative cover for a spare vehicle wheel and tire mounted on the exterior of a vehicle comprising:

a flexible tire cover with a first side having an inner surface, an outer surface, and a first opening;

an outer annular mounting ring, concentric with said first opening, having an inner diameter, an outer diameter, a first side and a second side affixed to said outer surface of said first side of said flexible tire cover;

an inner annular mounting ring, concentric with said outer annular mounting ring, having an inner diameter, an outer diameter, a first side and a second side and, said first side of said inner annular mounting ring being affixed to said inner surface of said flexible tire cover;

a cylindrical support ring, concentric with said inner annular mounting ring, having a diameter, and a length defined by a first end and a second end, said length extending along an axis perpendicular to said inner annular mounting ring, and said first end being attached to said second side of said inner annular mounting ring;

a front protective cover, concentric with said cylindrical support ring, made of transparent material having a first side and a second side, mounted within said cylindrical support ring, said first side being affixed to said second side of said inner annular mounting ring;

a rear protective cover, concentric with said cylindrical support ring, made of rigid material having a first side and a second ring, side, mounted within said cylindrical support ring;

a plurality of anchoring means for securing said rear protective cover against a circular sheet having decorative indicia placed in said cylindrical support ring between said rear and front protective covers.

8. The decorative cover for a spare vehicle wheel and tire mounted on the exterior of a vehicle according to claim 7, further comprising a sheet having a first side having decorative indicia and a rear side, concentrically disposed relative to said front protective cover so that said first side of said sheet is in contact with said second side of said front protective cover.

* * * * *